United States Patent
Sharma et al.

(10) Patent No.: US 12,238,214 B2
(45) Date of Patent: Feb. 25, 2025

(54) SYSTEM FOR GENERATION OF SUBSTITUTABLE CONFIGURATIONS OF SECURE ELECTRONIC DISTRIBUTED REGISTER TOKENS

(71) Applicant: BANK OF AMERICA CORPORATION, Charlotte, NC (US)

(72) Inventors: Yash Sharma, Delhi (IN); Sandeep Kumar Chauhan, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 389 days.

(21) Appl. No.: 17/592,141

(22) Filed: Feb. 3, 2022

(65) Prior Publication Data

US 2023/0246835 A1   Aug. 3, 2023

(51) Int. Cl.
*H04L 9/32* (2006.01)

(52) U.S. Cl.
CPC .......... *H04L 9/3213* (2013.01); *H04L 9/3236* (2013.01); *H04L 9/3247* (2013.01)

(58) Field of Classification Search
CPC ....... H04L 9/3213; H04L 9/50; H04L 9/3236; H04L 9/3247; H04L 2209/56
See application file for complete search history.

(56) References Cited

U.S. PATENT DOCUMENTS

| | | | |
|---|---|---|---|
| 8,316,237 B1 | 11/2012 | Felsher et al. | |
| 8,843,997 B1 | 9/2014 | Hare | |
| 8,866,701 B2 | 10/2014 | Momchilov et al. | |
| 9,002,018 B2 | 4/2015 | Wilkins et al. | |
| 9,049,010 B2 | 6/2015 | Jueneman et al. | |
| 9,177,169 B2 | 11/2015 | Shablygin et al. | |
| 9,705,817 B2 | 7/2017 | Lui et al. | |
| 9,712,486 B2 | 7/2017 | Johnson et al. | |
| 10,007,910 B2 | 6/2018 | von Mueller et al. | |
| 10,021,062 B2 | 7/2018 | LeVasseur et al. | |
| 10,607,484 B2 | 3/2020 | Yang et al. | |
| 10,997,190 B2 | 5/2021 | Porath et al. | |
| 11,126,613 B2 | 9/2021 | Ow et al. | |
| 2018/0247303 A1 | 8/2018 | Raj et al. | |
| 2019/0333059 A1 | 10/2019 | Fallah et al. | |
| 2020/0034837 A1 | 1/2020 | Narayan et al. | |
| 2020/0211006 A1 | 7/2020 | Ozvat et al. | |
| 2020/0234287 A1 | 7/2020 | Cronic et al. | |
| 2021/0294801 A1 | 9/2021 | Pal et al. | |
| 2021/0314395 A1 | 10/2021 | Basu et al. | |
| 2022/0075845 A1* | 3/2022 | Bowen | G06F 30/30 |

(Continued)

*Primary Examiner* — Jason K Gee
*Assistant Examiner* — Brian William Avery
(74) *Attorney, Agent, or Firm* — Moore & Van Allen PLLC; Nicholas C. Russell (57) ABSTRACT

A system is provided for generation of substitutable configuration of secure distributed register tokens. In particular, the system may generate, on a distributed register, a secure token with a built-in source code function for triggering a substitution of the secure token with one or more substitute tokens upon the occurrence of a specific condition. The function may pull one or more values associated with the secure token (e.g., from an oracle) and generate the one or more substitute tokens based on the one or more values. Once the substitute tokens are generated, the substitute tokens may be used to replace the secure token on the distributed register.

18 Claims, 3 Drawing Sheets

(56) References Cited

U.S. PATENT DOCUMENTS

| | | | |
|---|---|---|---|
| 2022/0222364 A1* | 7/2022 | Roberts | G06F 21/64 |
| 2023/0034621 A1* | 2/2023 | Pardo | H04L 9/3213 |
| 2023/0108610 A1* | 4/2023 | Tang | G06Q 20/3672 |
| | | | 705/66 |

* cited by examiner

SYSTEM FOR GENERATION OF SUBSTITUTABLE CONFIGURATIONS OF SECURE ELECTRONIC DISTRIBUTED REGISTER TOKENS

FIELD OF THE INVENTION

The present disclosure embraces a system for generation of substitutable configuration of secure distributed register tokens.

BACKGROUND

There is a need for an efficient way to generate substitutable secure tokens.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for generation of substitutable configuration of secure distributed register tokens. In particular, the system may generate, on a distributed register, a secure token with a built-in source code function for triggering a substitution of the secure token with one or more substitute tokens upon the occurrence of a specific condition. The function may pull one or more values associated with the secure token (e.g., from an oracle) and generate the one or more substitute tokens based on the one or more values. Once the substitute tokens are generated, the substitute tokens may be used to replace the secure token on the distributed register.

Accordingly, embodiments of the present disclosure provide a system for generation of substitutable configuration of secure distributed register tokens, the system comprising a memory device with computer-readable program code stored thereon; a communication device; and a processing device operatively coupled to the memory device and the communication device, wherein the processing device is configured to execute the computer-readable program code to generate a non-fungible token from a smart contract on a distributed register, wherein the smart contract comprises a custom function for generating substitute tokens based on the non-fungible token, wherein an owner ID associated with the non-fungible token is a first hash value; receive a request to convert the non-fungible token to one or more substitute tokens; based on receiving the request, execute the custom function of the smart contract, wherein executing the custom function comprises: based on a token ID associated with the non-fungible token, retrieving a value associated with the non-fungible token from a value database; generating a first set of substitute tokens, wherein a quantity of the first set of substitute tokens is based on the value associated with the non-fungible token; setting an owner ID associated with the first set of substitute tokens to the first hash value; and setting the owner ID associated with the non-fungible token to a null value.

In some embodiments, the computer-readable program code, when executed, further causes the processing device to generate a second non-fungible token from the smart contract, wherein an owner ID associated with the second non-fungible token is a second hash value, wherein executing the custom function further comprises, based on a token ID associated with the second non-fungible token, retrieving a value associated with the second non-fungible token from a value database; generating a second set of substitute tokens, wherein a quantity of the second set of substitute tokens is based on the value associated with the second non-fungible token; setting an owner ID associated with the second set of substitute tokens to the second hash value; and setting the owner ID associated with the second non-fungible token to a null value.

In some embodiments, the value database is an off-chain external database, wherein retrieving the value associated with the non-fungible token comprises the custom function accessing the external database through an oracle.

In some embodiments, the value database is stored within the distributed register.

In some embodiments, the request to convert the non-fungible token is received from a user computing device associated with a user, wherein the user computing device is associated with the first hash value.

In some embodiments, the request to convert the non-fungible token is received from an entity computing system based on a predefined condition, wherein the predefined condition is a passage of a predefined period of time.

Embodiments of the present disclosure also provide a computer program product for generation of substitutable configuration of secure distributed register tokens, the computer program product comprising at least one non-transitory computer readable medium having computer-readable program code portions embodied therein, the computer-readable program code portions comprising executable portions for generating a non-fungible token from a smart contract on a distributed register, wherein the smart contract comprises a custom function for generating substitute tokens based on the non-fungible token, wherein an owner ID associated with the non-fungible token is a first hash value; receiving a request to convert the non-fungible token to one or more substitute tokens; based on receiving the request, executing the custom function of the smart contract, wherein executing the custom function comprises: based on a token ID associated with the non-fungible token, retrieving a value associated with the non-fungible token from a value database; generating a first set of substitute tokens, wherein a quantity of the first set of substitute tokens is based on the value associated with the non-fungible token; setting an owner ID associated with the first set of substitute tokens to the first hash value; and setting the owner ID associated with the non-fungible token to a null value.

In some embodiments, the computer-readable program code portions further comprise executable portions for generating a second non-fungible token from the smart contract, wherein an owner ID associated with the second non-fungible token is a second hash value, wherein executing the custom function further comprises: based on a token ID associated with the second non-fungible token, retrieving a value associated with the second non-fungible token from a value database; generating a second set of substitute tokens, wherein a quantity of the second set of substitute tokens is based on the value associated with the second non-fungible token; setting an owner ID associated with the second set of substitute tokens to the second hash value; and setting the owner ID associated with the second non-fungible token to a null value.

In some embodiments, the value database is an off-chain external database, wherein retrieving the value associated with the non-fungible token comprises the custom function accessing the external database through an oracle.

In some embodiments, the value database is stored within the distributed register.

In some embodiments, the request to convert the non-fungible token is received from a user computing device associated with a user, wherein the user computing device is associated with the first hash value.

In some embodiments, the request to convert the non-fungible token is received from an entity computing system based on a predefined condition, wherein the predefined condition is a passage of a predefined period of time.

Embodiments of the present disclosure also provide a computer-implemented method for generation of substitutable configuration of secure distributed register tokens, the computer-implemented method comprising generating a non-fungible token from a smart contract on a distributed register, wherein the smart contract comprises a custom function for generating substitute tokens based on the non-fungible token, wherein an owner ID associated with the non-fungible token is a first hash value; receiving a request to convert the non-fungible token to one or more substitute tokens; based on receiving the request, executing the custom function of the smart contract, wherein executing the custom function comprises: based on a token ID associated with the non-fungible token, retrieving a value associated with the non-fungible token from a value database; generating a first set of substitute tokens, wherein a quantity of the first set of substitute tokens is based on the value associated with the non-fungible token; setting an owner ID associated with the first set of substitute tokens to the first hash value; and setting the owner ID associated with the non-fungible token to a null value.

In some embodiments, the computer-implemented method further comprises generating a non-fungible token from a smart contract on a distributed register, wherein the smart contract comprises a custom function for generating substitute tokens based on the non-fungible token, wherein an owner ID associated with the non-fungible token is a first hash value; receiving a request to convert the non-fungible token to one or more substitute tokens; based on receiving the request, executing the custom function of the smart contract, wherein executing the custom function comprises: based on a token ID associated with the non-fungible token, retrieving a value associated with the non-fungible token from a value database; generating a first set of substitute tokens, wherein a quantity of the first set of substitute tokens is based on the value associated with the non-fungible token; setting an owner ID associated with the first set of substitute tokens to the first hash value; and setting the owner ID associated with the non-fungible token to a null value.

In some embodiments, the value database is an off-chain external database, wherein retrieving the value associated with the non-fungible token comprises the custom function accessing the external database through an oracle.

In some embodiments, the value database is stored within the distributed register.

In some embodiments, the request to convert the non-fungible token is received from a user computing device associated with a user, wherein the user computing device is associated with the first hash value.

In some embodiments, the request to convert the non-fungible token is received from an entity computing system based on a predefined condition, wherein the predefined condition is a passage of a predefined period of time.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization such as a financial institution, a non-profit organization, a government organization, and the like, which may routinely use various types of applications within its enterprise environment to accomplish its organizational objectives.

"The system" or "entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Distributed register," which may also be referred to as a "distributed ledger," as used herein may refer to a structured list of data records that is decentralized and distributed amongst a plurality of computing systems and/or devices. In some embodiments, the distributed ledger may use a linked block structure.

"Linked block," "linked block structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the linked block structure. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified.

A "linked block ledger" may refer to a distributed ledger which uses linked block data structures. Generally, a linked block ledger is an "append only" ledger in which the data within each block within the linked block ledger may not be modified after the block is added to the linked block ledger; data may only be added in a new block to the end of the linked block ledger. In this way, the linked block ledger may provide a practically immutable ledger of data records over time.

"Permissioned distributed register" as used herein may refer to a linked block ledger for which an access control mechanism is implemented such that only known, authorized users may take certain actions with respect to the linked block ledger (e.g., add new data records, participate in the consensus mechanism, or the like). Accordingly, "unpermissioned distributed ledger" as used herein may refer to a linked block ledger without an access control mechanism.

"Private distributed register" as used herein may refer to a linked block ledger accessible only to users or devices that meet specific criteria (e.g., authorized users or devices of a certain entity or other organization). Accordingly, a "public distributed ledger" is a linked block ledger accessible by any member or device in the public realm.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid distributed ledger such that certain nodes may store certain segments of the linked block ledger but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

"Resource" as used herein may refer to tangible or intangible objects which may be held, owned, or used by a user and/or the entity. In this regard, examples of such resources may include electronic data files, documents, computing devices and/or other types of electronic hardware, physical objects, funds, financial instruments, computing resources, or the like. In some embodiments, a resource may be associated with one or more accounts (e.g., a user account). Accordingly, "resource transfer" or "resource transfer process" as used herein may refer to a transfer of resources from a resource origin to a resource destination, such as a data transfer, provisioning of hardware, transaction (e.g., funds transfer), or the like.

"Non-fungible token" or "NFT" as used herein may refer to data stored in a distributed register that may comprise a signature (e.g., a hash value or address) associated with a digital resource, where the signature certifies that the digital resource is unique (i.e., not interchangeable with other resources). The signature may further identify the owner of the digital resource (e.g., a user, entity, or the like). In this regard, the ownership of the digital resource may be governed by a smart contract stored within the distributed register and associated with the digital resource and/or the NFT. Examples of such digital resources may include image files, audio files, video files, documents, web pages, and the like. In particular, the digital resource may include a secure token that may serve as a data identifier associated with a particular computing device (e.g., a mobile device). In other embodiments, the signature may identify the owner of a non-digital resource, which may include physical objects (e.g., a tradeable card) and/or non-physical objects (e.g., securities) that may be associated with the signature. In some embodiments, the digital resource may be stored separately from the distributed register (e.g., off-chain on a database server). In other embodiments, the digital resource may be stored within the distributed register (e.g., on-chain within block data).

The system as described herein provides a way to generate a substitutable configuration for secure distributed register tokens within a distributed register. In this regard, each token that has been created and stored on the distributed register may be generated using a custom smart contract containing a function that is configured to substitute the token with one or more substitute tokens, where the number of substitute tokens may be determined by pulling data associated with the original token from a database.

In some embodiments, the secure token may be a non-fungible token (e.g., an NFT created according to an ERC-721 compliant smart contract) comprising a unique identifier or "token ID" (e.g., a hash value) that identifies the NFT on the distributed register. The token ID of the NFT may be mapped to an owner address to signify that the owner address possesses ownership of the NFT. The address in turn may be mapped to a balance value that indicates the value of the tokens linked with the address.

The smart contract of the NFT may include a custom function that is configured to restore fungibility of the NFT. The custom function may receive an array of token ID's (each of which may be associated with an NFT) as an input. For each of the token ID's, the function may retrieve value data associated with the token ID (and therefore the NFT), where the value data may indicate the value or worth of the NFT. In some embodiments, the value data may be retrieved from a database that is external to the distributed register (or "off-chain data") through the use of an oracle. Once the value data has been retrieved, the custom function may mint one or more new substitute tokens based on the value of the NFT being substituted, and subsequently set the ownership of the new substitute tokens to the address associated with the NFT. The smart contract may then set the ownership of the original NFT to a null value, thereby renouncing or "burning" the NFT. Through this process, the original NFT may be replaced by the one or more substitute tokens when the custom function is called.

An exemplary use case is provided as follows. It should be understood that the following example is provided for illustrative purposes only and is not intended to restrict or limit the scope of the disclosure. In one embodiment, a distributed register address may be associated with a plurality of NFT's (e.g., a first, second, and third NFT). In particular, each of the NFT's may be owned by the distributed register address. Each of the NFT's may in turn have individual or unique price values. For instance, the first NFT may have a value P1, the second NFT may have a value P2, and the third NFT may have a value P3.

At some point in time, it may be desirable to restore the fungibility of the NFT's such that the NFT's may be freely exchanged for one or more substitute tokens that are commensurate in value with each of the NFT's. In such a scenario, the system may execute the custom function associated with each of the NFT's (e.g., a "fungibilize" function). The function may retrieve the values of each of the NFT's (e.g., using an oracle) and mint new tokens based on the values of each of the NFT's. For example, the function may use an oracle to pull off-chain data regarding the value of the first NFT (e.g., P1). The function may then mint an amount of substitute tokens (where the substitute token may have a discrete value) that is equivalent to the value of the first NFT (e.g., P1) and set the distributed register address as the owner of the newly minted substitute tokens. Subsequently, the function may set the ownership of the first NFT to a null value (e.g., 0x0000 . . . ). After processing the first NFT, the function may repeat the above steps for the second NFT and the third NFT. Once the function has been successfully executed, the distributed register address will be associated with a number of new substitute tokens that is equivalent in value to the first NFT, second NFT, and the third NFT.

The system as described herein confers a number of technological advantages over conventional distributed register systems. For instance, by using a smart contract with built-in customized substitution functions, the system provides an efficient way to perform exchanges and substitution of NFT's for new tokens on the distributed register.

Figure 1:
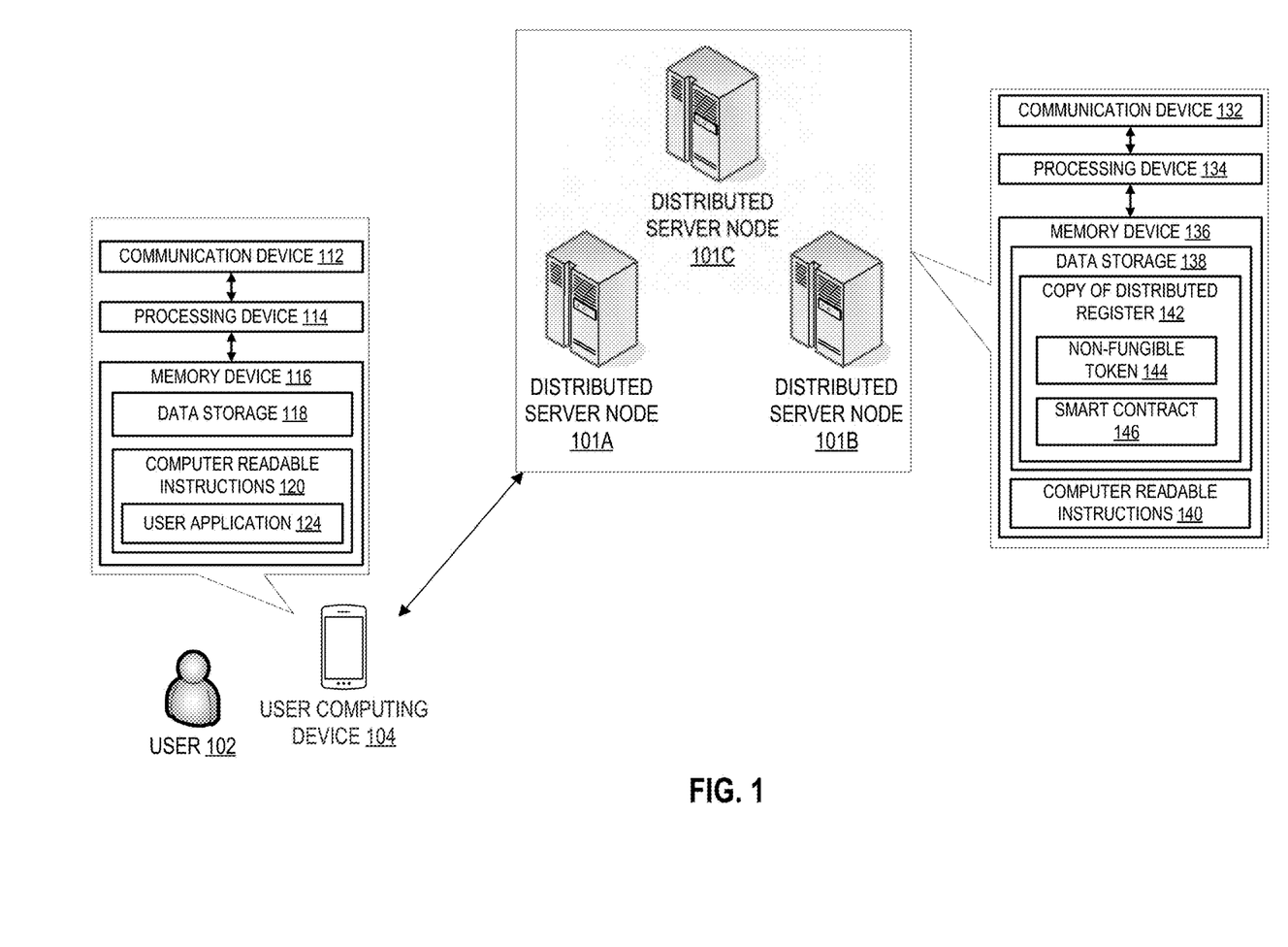
FIG. 1 illustrates an operating environment for the substitute token generation system, in accordance with one embodiment of the present disclosure.

Turning now to the figures, FIG. 1 illustrates an operating environment 100 for the substitute token generation system, in accordance with one embodiment of the present disclosure. In particular, FIG. 1 illustrates a user computing device 104 in operative communication with a plurality of distributed server nodes 101A, 101B, 101C over a network. In such a configuration, the computing systems within the network, including the user computing device 104 and distributed server nodes 101A, 101B, 101C may transmit data to and/or receive data from one another through the network.

It should be understood that FIG. 1 illustrates only an exemplary embodiment of the operating environment 100, and it will be appreciated that the operating environment 100 may comprise fewer or greater numbers of computing systems than what is depicted in FIG. 1. For example, though FIG. 1 depicts three distributed server nodes 101A, 101B, 101C, the operating environment may comprise a greater or fewer number of distributed server nodes depending on the embodiment. It should also be appreciated that one or more functions of the systems, devices, or servers as depicted in FIG. 1 may be combined into a single system, device, or server and/or performed by other computing systems. Furthermore, the functions of a single system, device, or server as depicted in FIG. 1 may be distributed across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), Wi-Fi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the distributed server nodes 101A, 101B, 101C may form a cluster of nodes that host a distributed register on which the secure tokens (e.g., NFT's) may be stored. Accordingly, the distributed server nodes 101A, 101B, 101C may each comprise a communication device 132, a processing device 134, and a memory device 136, where the processing device 134 is operatively coupled to the communication device 132 and the memory device 136. The processing device 134 uses the communication device 132 to communicate with the network and other devices on the network. As such, the communication device 132 generally comprises a modem, antennae, Wi-Fi or Ethernet adapter, radio transceiver, or other device for communicating with other devices on the network.

The memory device 136 comprises computer-readable instructions 140 and data storage 138, where the data storage 138 may comprise a copy of a distributed register 142. The distributed register (and the copy of the distributed register 142), as described elsewhere herein, may comprise a series of data records relevant to the objectives of an entity associated with the distributed server network. In this regard, the distributed server nodes 101A, 101B, 101C may be able to read data from the distributed register, submit data records to the distributed register, participate in consensus mechanisms, or the like. The copy of the distributed register 142 may further comprise a smart contract 146 containing a custom function to generate a non-fungible token 144 that may be convertible or substitutable, as described elsewhere herein.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 152, and other communication devices as described herein, may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the systems described herein may also include a communication interface device that may be connected by a hardwire connection to the resource distribution device. The interface device may comprise a connector such as a USB, SATA, PATA, SAS or other data connector for transmitting data to and from the respective computing system.

As further illustrated in FIG. 1, the user computing device 104 may be in operative communication with the distributed server nodes 101A, 101B, 101C. The user computing device 104 may be a device that may be owned and/or operated by a user (e.g., the user 102, who may be associated with the distributed register address that is designated as the owner of the non-fungible token 144) for the performing the conversion or substitution of the non-fungible token 144 stored within the distributed register. In particular, the user computing device 104 may be a portable device such as a smartphone which may be used to access the copy of the distributed register 142 stored on the distributed server nodes 101A, 101B, and 101C for the purpose of initiating the custom function within the smart contract 146 associated with the non-fungible token 144.

Accordingly, the user computing device 104 may comprise a communication device 112, a processing device 114, and a memory device 116. In some embodiments, the user computing device 104 may comprise hardware and/or software components that allow the user computing device 104 to interface with the user 102. In such embodiments, the user computing device 104 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The memory device 116 of the user computing device 104 may further comprise data storage 118 and computer-readable instructions 120 stored thereon, where the computer-readable instructions 120 may comprise a user application 124. The user application 124 may be a software application that allows the user 102 to initiate the conversion of the non-fungible token 144, receive notifications or alerts regarding the non-fungible token 144, and the like. Accordingly, in some embodiments, the user application 124 may be an application provided by the entity and configured to access the distributed server nodes 101A, 101B, 101C. In other embodiments, the user application 124 may be a third party application such as a web browser, which may be used to access an entity server configured to provide selective access to the distributed server nodes 101A, 101B, 101C.

The communication devices as described herein may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the distributed register node 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic, or other systems that perform various functions of the computing systems. These systems may comprise, for example, electrical circuits, motors, compressors, or any system that enables functioning of the computing systems.

Figure 2:
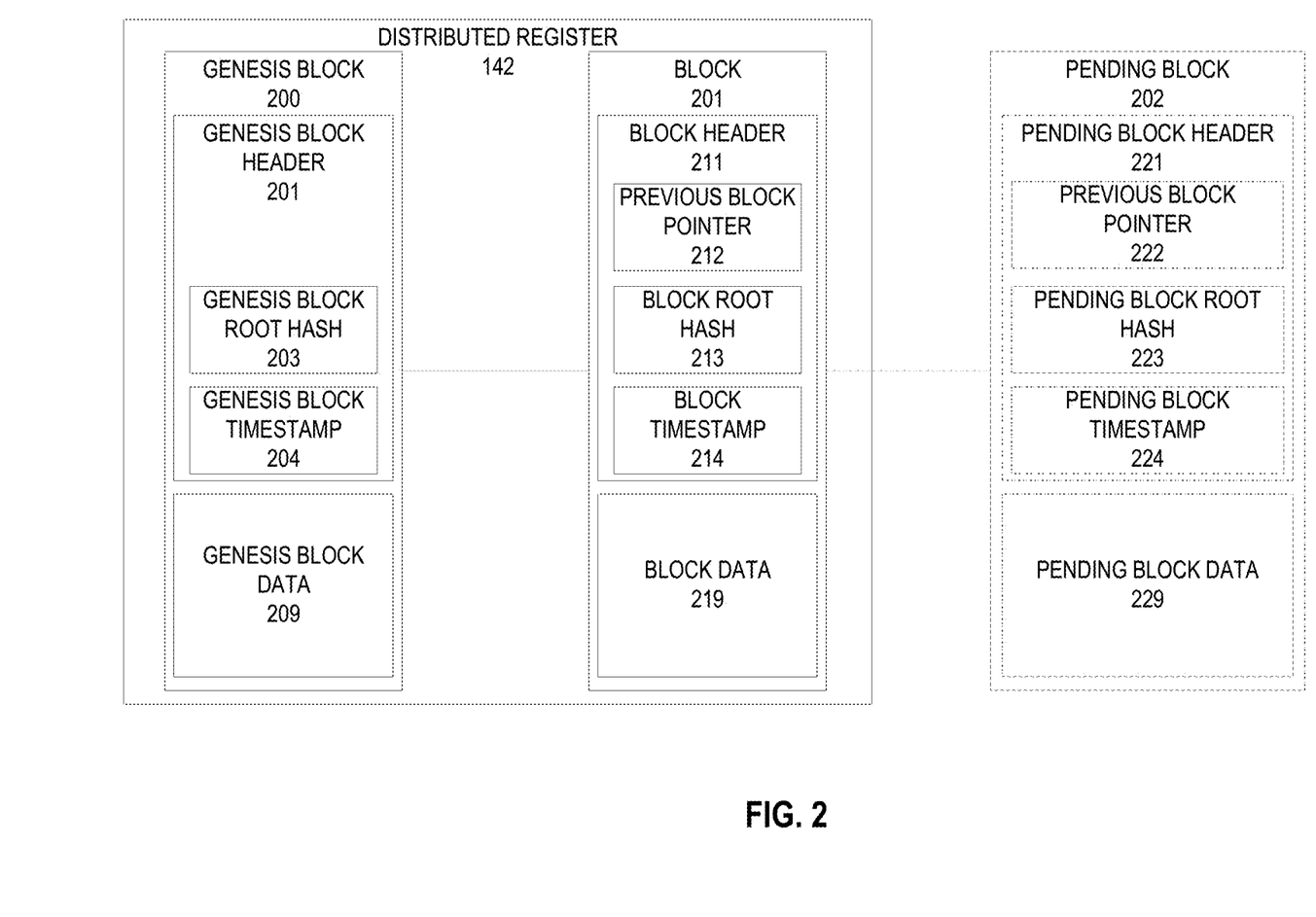
FIG. 2 is a block diagram illustrating the data structures within an exemplary distributed register, in accordance with one embodiment of the present disclosure.

FIG. 2 is a block diagram illustrating the data structures within an exemplary distributed register, in accordance with some embodiments. In particular, FIG. 2 depicts a plurality of blocks 200, 201 within the distributed register 142, in addition to a pending block 202 that has been submitted to be appended to the distributed register 142. The distributed register 142 may comprise a genesis block 200 that serves as the first block and origin for subsequent blocks in the distributed register 142. The genesis block 200, like all other blocks within the distributed register 142, comprise a block header 201 and block data 209. The genesis block data 209, or any other instances of block data within the distributed register 142 (or any other distributed register) may contain one or more data records. For instance, block data may comprise software source code, authentication data, transaction data, documents, or other data containers, third party information, regulatory and/or legal data, or the like.

The genesis block header 201 may comprise various types of metadata regarding the genesis block data 209. In some embodiments, the block header 201 may comprise a genesis block root hash 203, which is a hash derived from an algorithm using the genesis block data 209 as inputs. In some embodiments, the genesis block root hash 203 may be a Merkle root hash, wherein the genesis block root hash 203 is calculated via a hash algorithm based on a combination of the hashes of each data record within the genesis block data 209. In this way, any changes to the data within the genesis block data 209 will result in a change in the genesis block root hash 203. The genesis block header 201 may further comprise a genesis block timestamp 204 that indicates the time at which the block was written to the distributed register 142. In some embodiments, the timestamp may be a Unix timestamp. In some embodiments, particularly in ledgers utilizing a PoW consensus mechanism, the block header 201 may comprise a nonce value and a difficulty value. The nonce value may be a whole number value that, when combined with the other items of metadata within the block header 201 into a hash algorithm, produces a hash output that satisfies the difficulty level of the cryptographic puzzle as defined by the difficulty value. For instance, the consensus mechanism may require that the resulting hash of the block header 201 falls below a certain value threshold (e.g., the hash value must start with a certain number of zeroes, as defined by the difficulty value).

A subsequent block 201 may be appended to the genesis block 200 to serve as the next block in the linked block structure. Like all other blocks, the subsequent block 201 comprises a block header 211 and block data 219. Similarly, the block header 211 comprise a block root hash 213 of the data within the block data 219 and a block timestamp 214. The block header 211 may further comprise a previous block pointer 212, which may be a hash calculated by combining the hashes of the metadata (e.g., the genesis block root hash 203, genesis block timestamp 204, and the like) within the block header 201 of the genesis block 200. In this way, the block pointer 212 may be used to identify the previous block (e.g., the genesis block 200) in the distributed register 142, thereby creating a "chain" comprising the genesis block 200 and the subsequent block 201.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the ledger to pass the validation checks imposed by the consensus algorithm. Thus, the computational impracticability of altering data records in a ledger in turn greatly reduces the probability of improper alteration of data records.

A pending block 202 or "proposed block" may be submitted for addition to the distributed register 142. The pending block 202 may comprise a pending block header 221, which may comprise a pending block root hash 223, a previous block pointer 222 that points to the previous block 201, a pending block timestamp 224, and pending block data 229. Once a pending block 202 is submitted to the system, the nodes within the system may validate the pending block 202 via a consensus algorithm. The consensus algorithm may be, for instance, a proof of work mechanism, in which a node determines a nonce value that, when combined with a hash of the block header 211 of the last block in the linked block structure, produces a hash value that falls under a specified threshold value. For instance, the PoW algorithm may require that said hash value begins with a certain number of zeroes. Once said nonce value is determined by one of the nodes, the node may post the "solution" to the other nodes. Once the solution is validated by the other nodes, the hash of the block header 211 is included in the pending block header 221 of the pending block 202 as the previous block pointer 222. The pending block header 221 may further comprise the pending block root hash 223 of the pending block data 229 which may be calculated based on the winning solution. The pending block 202 is subsequently considered to be appended to the previous block 201 and becomes a part of the distributed register 142. A pending block timestamp 224 may also be added to signify the time at which the pending block 202 is added to the distributed register 142.

In other embodiments, the consensus mechanism may be based on a total number of consensus inputs submitted by the nodes of the distributed register 142, e.g., a PBFT consensus mechanism. Once a threshold number of consensus inputs to validate the pending block 202 has been reached, the pending block 202 may be appended to the distributed register 142. In such embodiments, nonce values and difficulty values may be absent from the block headers. In still other embodiments, the consensus algorithm may be a Proof-of-Stake mechanism in which the stake (e.g., amount of digital currency, reputation value, or the like) may influence the degree to which the node may participate in consensus and select the next proposed block. In other embodiments, the consensus algorithm may be a Proof-of-Authority mechanism in which the identity of the validator itself (with an attached reputation value) may be used to validate proposed data records (e.g., the ability to participate in consensus/approval of proposed data records may be limited to approved and/or authorized validator nodes). In yet other embodiments, the consensus algorithm may comprise a manual node approval process rather than an automated process.

Figure 3:
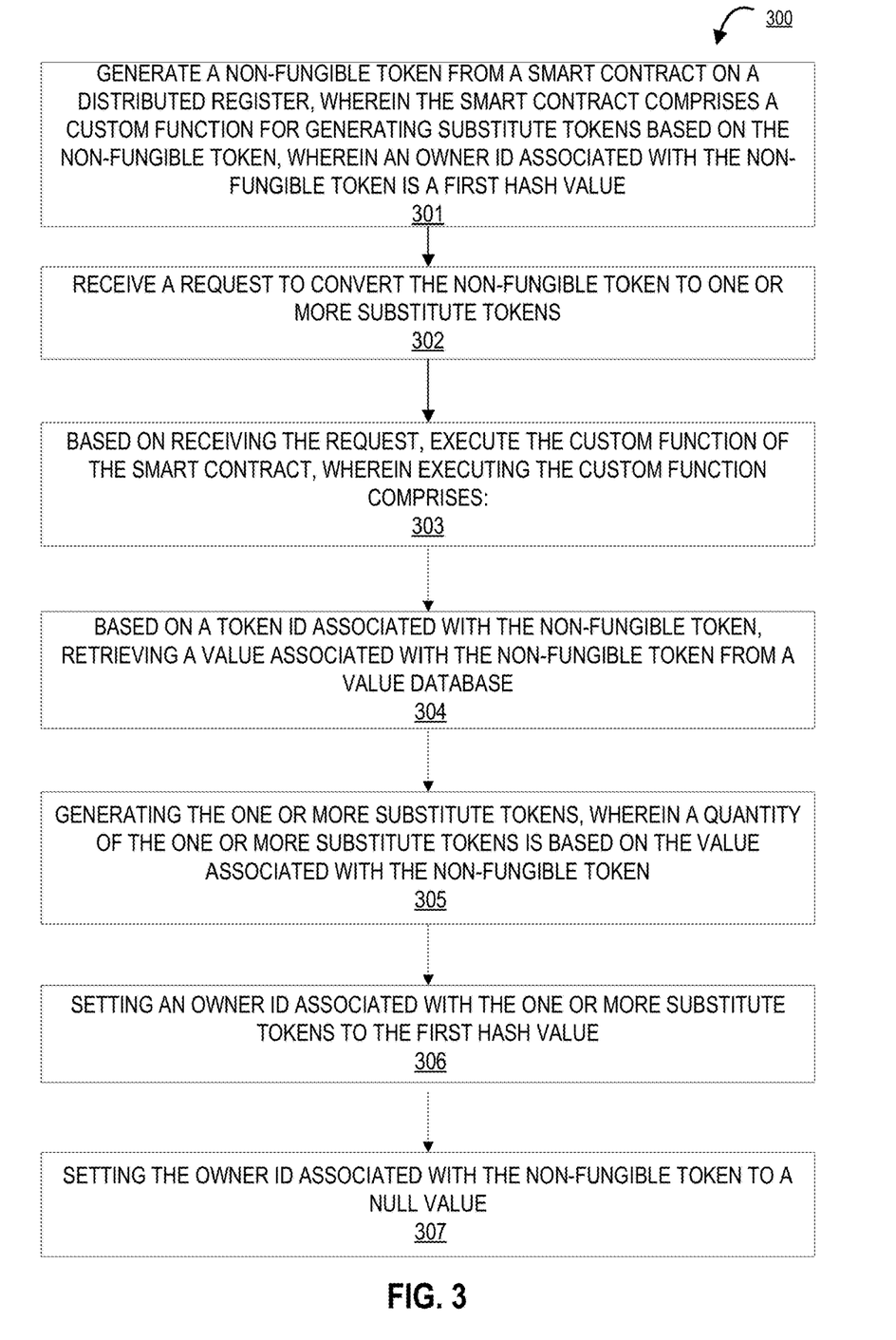
FIG. 3 is a flow diagram illustrating a process for generation of substitutable configuration of secure distributed register tokens, in accordance with one embodiment of the present disclosure.

FIG. 3 is a flow diagram illustrating a process flow 300 for generation of substitutable configuration of secure distributed register tokens, in accordance with one embodiment of the present disclosure. The process begins at block 301, where the system generates a non-fungible token from a smart contract on a distributed register, wherein the smart contract comprises a custom function for generating substitute tokens based on the non-fungible token, wherein an owner ID associated with the non-fungible token is a first hash value. In this regard, the non-fungible token may have a built-in functionality to render the non-fungible token substitutable or fungible upon the occurrence of a predefined condition. For instance, the predefined condition may be a request to render the NFT fungible. In some embodiments, the smart contract may be an EIP-721 compliant smart contract, though it is within the scope of the disclosure for the smart contract to be written based on other standards and/or other distributed register platforms. The owner of the non-fungible token may be uniquely identified by a hash value (e.g., the first hash value), which may be associated with a token ID of the non-fungible token.

The process continues to block 302, where the system receives a request to convert the non-fungible token to one or more substitute tokens. The system may receive a request, for instance, from a user through a user computing device (e.g., a smartphone of the user). In this regard, the user may be associated with an identifier (e.g., a hash value) which is registered as the owner of the token ID associated with the non-fungible token. Accordingly, the system may display a graphical interface of a distributed register platform associated with the non-fungible token, where the platform is configured to receive commands from the user to manage the non-fungible token. Within the graphical interface, the user may select an option to substitute the non-fungible token with one or more substitute tokens (e.g., fungibilize the non-fungible token to mint new tokens in its place). In other embodiments, the request may be transmitted automatically from another computing system (which may be owned and/or operated by an entity) that upon a trigger event (e.g., the passage of a predetermined period of time).

The process continues to block 303, where the system, based on receiving the request, executing the custom function of the smart contract. Executing the custom function may comprise the steps as detailed below. It should be noted that the functions of the custom function may be executed for each non-fungible token and/or owners specified as parameters for the custom function. Accordingly, the custom function may process multiple non-fungible tokens (e.g., a first NFT, second NFT, third NFT, and the like), where each non-fungible token may have an owner who may be the same or distinct from the owners of any other non-fungible token.

The process continues to block 304, where the system, based on a token ID associated with the non-fungible token, retrieves a value associated with the non-fungible token from a value database. The values within the value database may indicate the value or worth of a particular non-fungible token. In this regard, the value may be a numerical price value of the non-fungible token in a designated currency. In some embodiments, the value database may be an external database containing data separately from the distributed register (e.g., off-chain data). In such embodiments, the custom function of the smart contract may access the external database through an oracle. In other embodiments, the value database may be a database stored within the distributed register (e.g., on-chain data).

The process continues to block 305, where the system generates the one or more substitute tokens, wherein a quantity of the one or more substitute tokens is based on the value associated with the non-fungible token. In this regard, each substitute token may in turn have a discrete value or worth. Accordingly, the number of substitute tokens minted by the system is determined by dividing the value of the non-fungible token by the value of one substitute token. In some embodiments, the number of substitute tokens generated may include fractional (or non-whole number) values. Upon generation, the ownership of the one or more substitute tokens may be set to the owner ID associated with the non-fungible token that was substituted.

The process continues to block 306, where the system setting an owner ID associated with the one or more substitute tokens to the first hash value. At this stage, the one or more substitute tokens will be considered by the system (and the nodes of the distributed register) to be owned by the owner of the non-fungible token that has been substituted.

The process concludes at block 307, where the system sets an owner ID associated with the one or more substitute tokens to the first hash value. In this way, the non-fungible token may be considered to be "burned" by the system. Through the process described herein, the invention provides an efficient and secure way to restore fungibility to non-fungible tokens and replace such tokens with substitute tokens.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined, or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generation of substitutable configuration of secure distributed register tokens, the system comprising:
a memory device with computer-readable program code stored thereon;
a communication device; and
a processing device operatively coupled to the memory device and the communication device, wherein the processing device is configured to execute the computer-readable program code to:
generate a non-fungible token from a smart contract on a distributed register, wherein the smart contract comprises a custom function for generating substitute tokens based on the non-fungible token, wherein an owner ID associated with the non-fungible token is a first hash value;
receive a request to convert the non-fungible token to one or more substitute tokens;
based on receiving the request, execute the custom function of the smart contract, wherein executing the custom function comprises:
based on a token ID associated with the non-fungible token, retrieving a value associated with the non-fungible token from a value database;
generating a first set of substitute tokens, wherein a quantity of the first set of substitute tokens is based on the value associated with the non-fungible token, wherein the quantity of the first set of substitute tokens is computed by dividing the value associated with the non-fungible token by the value of one substitute token;
setting an owner ID associated with the first set of substitute tokens to the first hash value; and
based on detecting that the owner ID associated with the first set of substitute tokens has been set to the first hash value, setting the owner ID associated with the non-fungible token to a null value.

2. The system according to claim 1, wherein the computer-readable program code, when executed, further causes the processing device to:
generate a second non-fungible token from the smart contract, wherein an owner ID associated with the second non-fungible token is a second hash value, wherein executing the custom function further comprises:
based on a token ID associated with the second non-fungible token, retrieving a value associated with the second non-fungible token from a value database;
generating a second set of substitute tokens, wherein a quantity of the second set of substitute tokens is based on the value associated with the second non-fungible token;
setting an owner ID associated with the second set of substitute tokens to the second hash value; and
setting the owner ID associated with the second non-fungible token to a null value.

3. The system according to claim 1, wherein the value database is an off-chain external database, wherein retrieving the value associated with the non-fungible token comprises the custom function accessing the external database through an oracle.

4. The system according to claim 1, wherein the value database is stored within the distributed register.

5. The system according to claim 1, wherein the request to convert the non-fungible token is received from a user computing device associated with a user, wherein the user computing device is associated with the first hash value.

6. The system according to claim 1, wherein the request to convert the non-fungible token is received from an entity computing system based on a predefined condition, wherein the predefined condition is a passage of a predefined period of time.

7. A computer program product for generation of substitutable configuration of secure distributed register tokens, the computer program product comprising at least one non-transitory computer readable medium having computer-readable program code portions embodied therein, the computer-readable program code portions comprising executable portions for:
generating a non-fungible token from a smart contract on a distributed register, wherein the smart contract comprises a custom function for generating substitute tokens based on the non-fungible token, wherein an owner ID associated with the non-fungible token is a first hash value;

receiving a request to convert the non-fungible token to one or more substitute tokens;

based on receiving the request, executing the custom function of the smart contract, wherein executing the custom function comprises:

based on a token ID associated with the non-fungible token, retrieving a value associated with the non-fungible token from a value database;

generating a first set of substitute tokens, wherein a quantity of the first set of substitute tokens is based on the value associated with the non-fungible token, wherein the quantity of the first set of substitute tokens is computed by dividing the value associated with the non-fungible token by the value of one substitute token;

setting an owner ID associated with the first set of substitute tokens to the first hash value; and     based on detecting that the owner ID associated with the first set of substitute tokens has been set to the first hash value, setting the owner ID associated with the non-fungible token to a null value.

8. The computer program product of claim 7, wherein the computer-readable program code portions further comprise executable portions for:

generating a second non-fungible token from the smart contract, wherein an owner ID associated with the second non-fungible token is a second hash value, wherein executing the custom function further comprises:

based on a token ID associated with the second non-fungible token, retrieving a value associated with the second non-fungible token from a value database;

generating a second set of substitute tokens, wherein a quantity of the second set of substitute tokens is based on the value associated with the second non-fungible token;

setting an owner ID associated with the second set of substitute tokens to the second hash value; and     setting the owner ID associated with the second non-fungible token to a null value.

9. The computer program product of claim 7, wherein the value database is an off-chain external database, wherein retrieving the value associated with the non-fungible token comprises the custom function accessing the external database through an oracle.

10. The computer program product of claim 7, wherein the value database is stored within the distributed register.

11. The computer program product of claim 7, wherein the request to convert the non-fungible token is received from a user computing device associated with a user, wherein the user computing device is associated with the first hash value.

12. The computer program product of claim 7, wherein the request to convert the non-fungible token is received from an entity computing system based on a predefined condition, wherein the predefined condition is a passage of a predefined period of time.

13. A computer-implemented method for generation of substitutable configuration of secure distributed register tokens, the computer-implemented method comprising:

generating a non-fungible token from a smart contract on a distributed register, wherein the smart contract comprises a custom function for generating substitute tokens based on the non-fungible token, wherein an owner ID associated with the non-fungible token is a first hash value;

receiving a request to convert the non-fungible token to one or more substitute tokens;

based on receiving the request, executing the custom function of the smart contract, wherein executing the custom function comprises:

based on a token ID associated with the non-fungible token, retrieving a value associated with the non-fungible token from a value database;

generating a first set of substitute tokens, wherein a quantity of the first set of substitute tokens is based on the value associated with the non-fungible token, wherein the quantity of the first set of substitute tokens is computed by dividing the value associated with the non-fungible token by the value of one substitute token;

setting an owner ID associated with the first set of substitute tokens to the first hash value; and     based on detecting that the owner ID associated with the first set of substitute tokens has been set to the first hash value, setting the owner ID associated with the non-fungible token to a null value.

14. The computer-implemented method of claim 13, wherein the computer-implemented method further comprises:

generating a non-fungible token from a smart contract on a distributed register, wherein the smart contract comprises a custom function for generating substitute tokens based on the non-fungible token, wherein an owner ID associated with the non-fungible token is a first hash value;

receiving a request to convert the non-fungible token to one or more substitute tokens;

based on receiving the request, executing the custom function of the smart contract, wherein executing the custom function comprises:

based on a token ID associated with the non-fungible token, retrieving a value associated with the non-fungible token from a value database;

generating a first set of substitute tokens, wherein a quantity of the first set of substitute tokens is based on the value associated with the non-fungible token;

setting an owner ID associated with the first set of substitute tokens to the first hash value; and     setting the owner ID associated with the non-fungible token to a null value.

15. The computer-implemented method of claim 13, wherein the value database is an off-chain external database, wherein retrieving the value associated with the non-fungible token comprises the custom function accessing the external database through an oracle.

16. The computer-implemented method of claim 13, wherein the value database is stored within the distributed register.

17. The computer-implemented method of claim 13, wherein the request to convert the non-fungible token is received from a user computing device associated with a user, wherein the user computing device is associated with the first hash value.

18. The computer-implemented method of claim 13, wherein the request to convert the non-fungible token is received from an entity computing system based on a predefined condition, wherein the predefined condition is a passage of a predefined period of time.

* * * * *